(12) United States Patent
Honji

(10) Patent No.: US 8,177,022 B2
(45) Date of Patent: May 15, 2012

(54) TRANSMITTED SOUND CONTROL APPARATUS

(75) Inventor: Yoshikazu Honji, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/799,114

(22) Filed: Apr. 19, 2010

(65) Prior Publication Data

US 2010/0263963 A1    Oct. 21, 2010

(30) Foreign Application Priority Data

Apr. 21, 2009 (JP) ................................. 2009-102522
Mar. 31, 2010 (JP) ................................. 2010-80917

(51) Int. Cl.
*G10K 11/00* (2006.01)

(52) U.S. Cl. ......... 181/175; 181/204; 181/214; 181/240

(58) Field of Classification Search .................. 181/175, 181/204, 214, 240
See application file for complete search history.

(56) References Cited

U.S. PATENT DOCUMENTS

| | | | | |
|---|---|---|---|---|
| 4,682,670 A | * | 7/1987 | Lerner et al. ............... | 181/287 |
| 4,701,951 A | * | 10/1987 | Kash ........................... | 381/304 |
| 5,250,763 A | * | 10/1993 | Brown ........................ | 181/155 |
| 5,764,783 A | * | 6/1998 | Ferralli ...................... | 381/160 |
| 6,122,386 A | * | 9/2000 | Wiley ......................... | 381/160 |
| 7,621,370 B2 | * | 11/2009 | Abe et al. ................... | 181/204 |
| 2002/0157897 A1 | * | 10/2002 | Hofmann et al. .......... | 181/214 |
| 2003/0057015 A1 | * | 3/2003 | Helber et al. .............. | 181/240 |
| 2004/0094112 A1 | * | 5/2004 | Hoffmann et al. ........ | 123/184.57 |
| 2004/0195040 A1 | * | 10/2004 | Vaishya et al. ............ | 181/206 |
| 2005/0121256 A1 | * | 6/2005 | Hofmann et al. .......... | 181/271 |
| 2007/0295553 A1 | * | 12/2007 | Ochi et al. ................. | 181/18 |
| 2008/0075312 A1 | | 3/2008 | Lan et al. | |

FOREIGN PATENT DOCUMENTS

| | | |
|---|---|---|
| GB | 2 184 323 A | 6/1987 |
| JP | 62-017548 A | 1/1987 |
| JP | 2755094 B2 | 8/1994 |

(Continued)

OTHER PUBLICATIONS

European Patent Office "Extended European Search Report" of European Patent Application No. EP 10 004 182.1, dated Sep. 24, 2010, 6 pages.

Yamaha News Release—"Yamaha Creates Acoustic Design for Engine of the Lexus LFA Super Sports Car"—on display at the Oct. 2009 Tokyo Motor Show dated Oct. 21, 2009.

(Continued)

*Primary Examiner* — Forrest M Phillips

(74) *Attorney, Agent, or Firm* — Pillsbury Winthrop Shaw Pittman LLP

(57) ABSTRACT

Wall partitioning between outside and inside of a room has an opening portion closed with a film. Sound insulating plate, comprising a lamination of a sound reflecting plate and a sound absorbing member, is supported in opposed relation to the opening portion and at an interval from the opening portion. Sound transmitted from outside of the room into the room through the film is reflected from the sound reflecting plate and then diffracted via sides of the interval, defined between the sound reflecting plate and the wall, to behind the reflecting plate to reach a human listener. Thus, with a mechanical construction, sound, propagated from outside the room into the room, can be made to be heard as sound of frequency characteristics desired by a human listener present in the room.

16 Claims, 10 Drawing Sheets

FOREIGN PATENT DOCUMENTS

| | | |
|---|---|---|
| JP | 2000-122670 A | 4/2000 |
| JP | 2004-218458 A | 8/2004 |
| JP | 2006-184681 A | 7/2006 |
| JP | 2008-002318 A | 1/2008 |
| JP | 2009-040130 A | 2/2009 |
| JP | 2009-041381 A | 2/2009 |

OTHER PUBLICATIONS

State Intellectual Property Office of People's Republic of China, "Notification of the First Office Action" Patent Application No. 201010154366.6 of Yamaha, Corporation; Issue Date: Aug. 3, 2011; 5 pages.

* cited by examiner

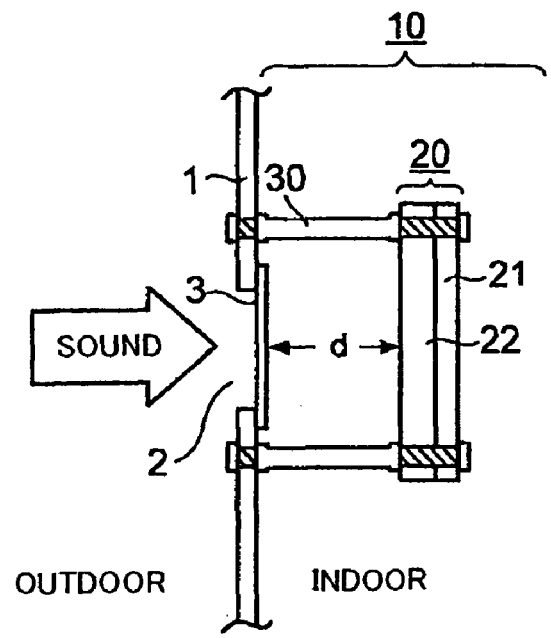
F I G. 1
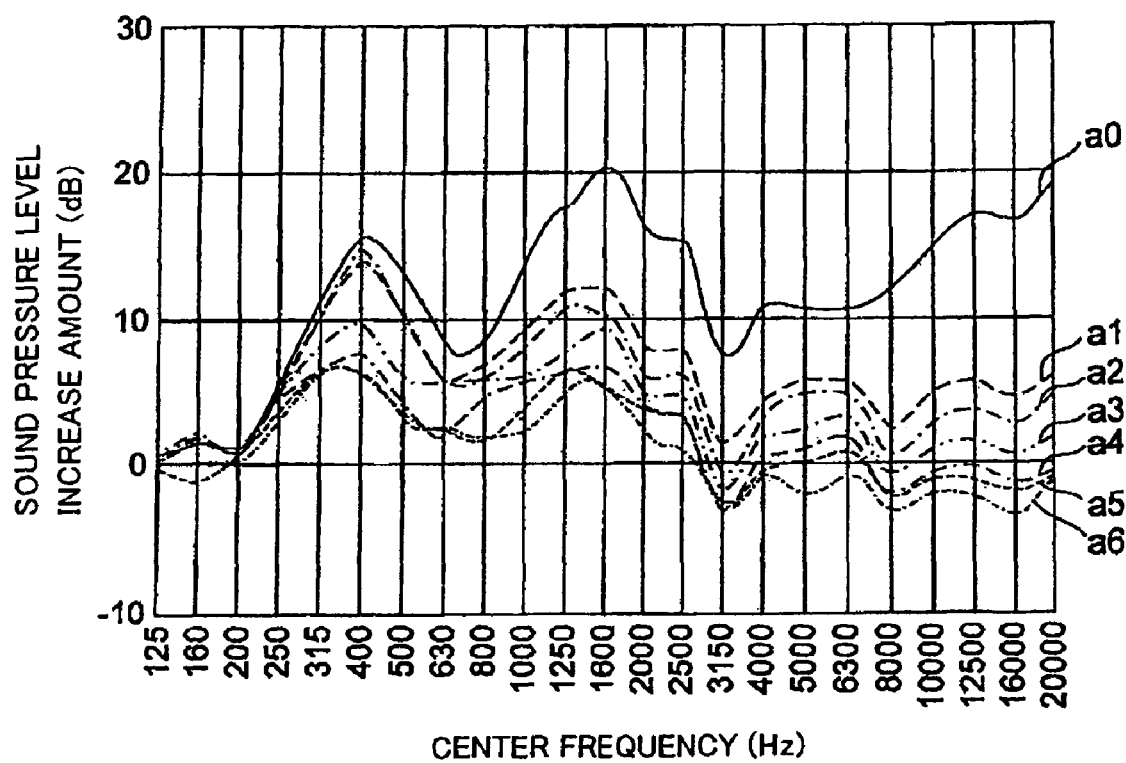
F I G. 2

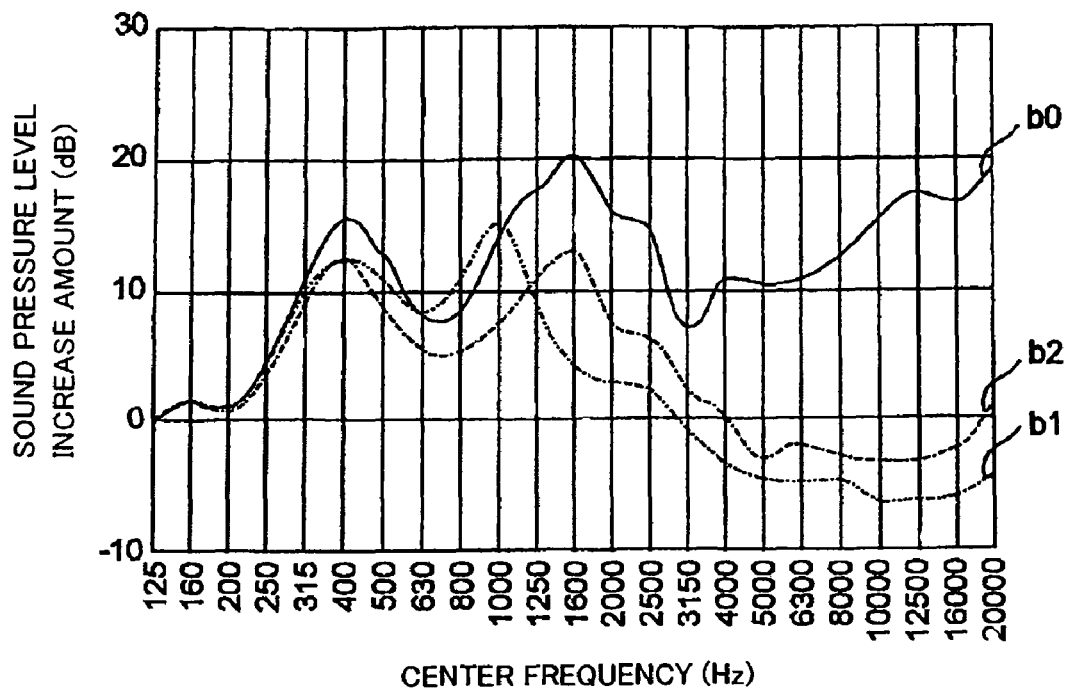
F I G. 3
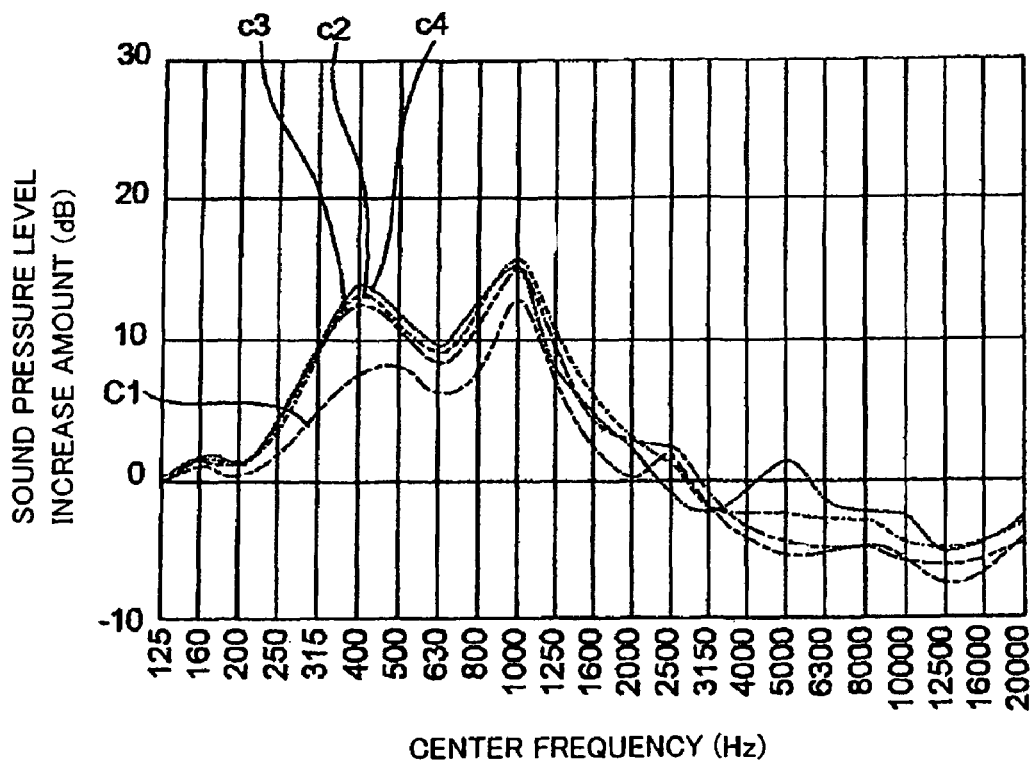
F I G. 4

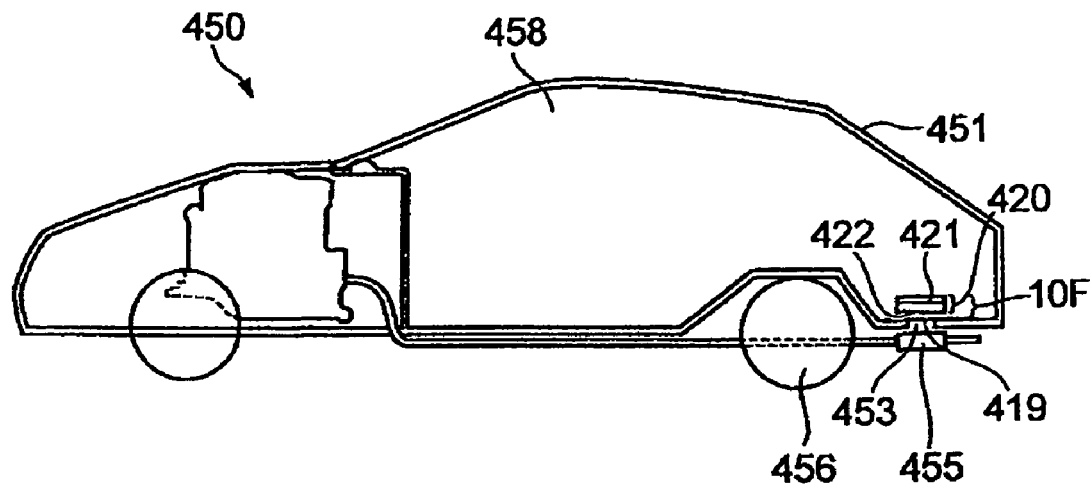
F I G. 1 5
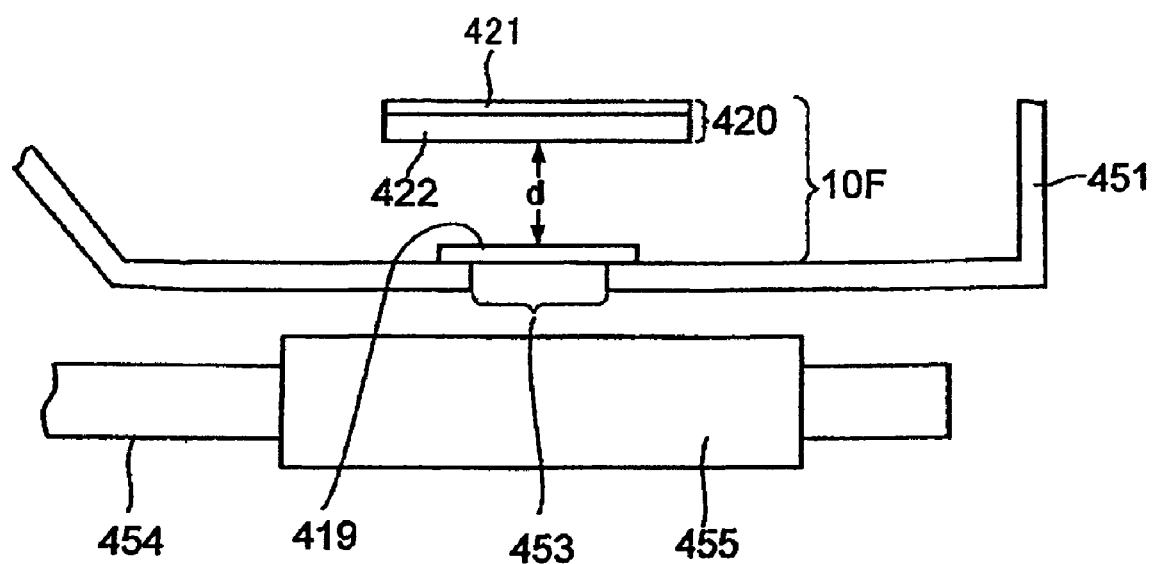
F I G. 1 6

TRANSMITTED SOUND CONTROL APPARATUS

BACKGROUND

The present invention relates a technique for controlling an acoustic quality of sound coming from outside a room (or outside a vehicle) into the room (or vehicle).

Japanese Patent No. 2755094 discloses a technique for alleviating a cooped-up feeling which may be felt by a person present in a sound-insulated, soundproof chamber. According to the technique disclosed in the No. 2755094 patent, the soundproof chamber is provided within a room, and one or both of an outdoor microphone provided outside the room and an indoor microphone provided outside the soundproof chamber within the room are selected, through operation on an operation section, so that sound signals picked up by the selected microphone or microphones are audibly reproduced or sounded via a speaker provided within the soundproof chamber.

However, while the person in the room may feel a cooped-up feeling if sound propagated from outside the room (i.e., outdoor sound) is completely blocked by walls etc., the person may feel noisy if sound from outside the room is heard with an original (i.e., unchanged) acoustic quality. With a sound signal processing system including a microphone and a speaker, an outdoor sound can be made to be heard as sound of an acoustic quality suiting a preference of the person; in this case, however, a power supply is required, so that a necessary apparatus construction would increase in size.

SUMMARY OF THE INVENTION

In view of the foregoing, it is an object of the present invention to provide a technique for allowing sound, propagated from outside a room into the room, to be heard as sound having frequency characteristics desired by a person (or human listener) present in the room.

The present invention provides an improved transmitted sound control apparatus which includes a sound insulating plate supported at an interval from a boundary surface having an opening portion and in opposed relation to the opening. In the present invention, sound produced outside the boundary surface transmits through the opening portion to propagate to inside of the boundary surface. Then, the sound (i.e., transmitted sound) is reflected from the sound insulating plate, and the thus-reflected sound is diffracted via side edge portions of the interval, defined between the sound insulating plate and the boundary surface, rearwardly (i.e., rearwardly assuming that the sound reflected direction is referred to as forwardly) to behind the sound insulating plate and propagate to the human listener. In the present invention, components of various frequency bands of the sound, having transmitted through the opening portion to propagate to inside of the boundary surface, are changed when it is reflected from the sound insulating plate and when it is diffracted rearwardly to behind the sound insulating plate, so that the sound can be made to be heard as sound having frequency characteristics desired by the human listener.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 1 is a diagram showing an example general setup of a first embodiment of a transmitted sound control apparatus of the present invention;

FIG. 2 is a graph showing sound pressure level increase amount vs. frequency characteristics in a room provided with the transmitted sound control apparatus of FIG. 1;

FIG. 3 is a graph showing sound pressure level increase amount vs. frequency characteristics in the room provided with the transmitted sound control apparatus of FIG. 1;

FIG. 4 is a graph showing sound pressure level increase amount vs. frequency characteristics in the room provided with the transmitted sound control apparatus of FIG. 1;

FIG. 15 is a view showing constructions of a sixth embodiment of the transmitted sound control apparatus of the present invention and an automotive vehicle provided with the sixth embodiment of the transmitted sound control apparatus;

FIG. 16 is an enlarged view of the transmitted sound control apparatus shown in FIG. 15;

DETAILED DESCRIPTION

First Embodiment

Figure 5:
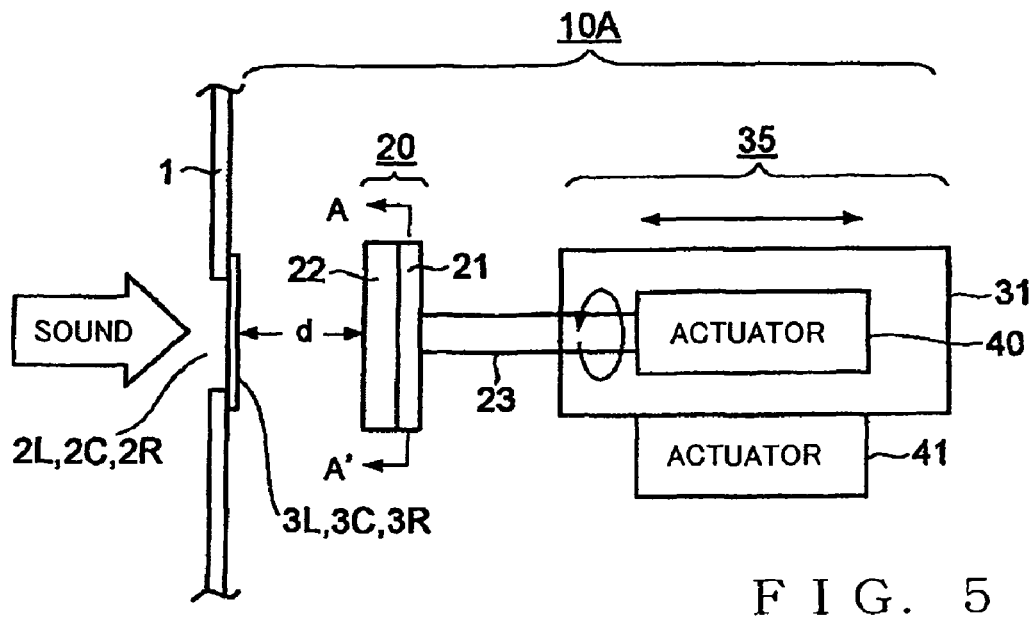
FIG. 5 is a block diagram showing a general setup of a transmitted sound control apparatus constructed as a specific applied example of the embodiment of FIG. 1.

FIG. 1 is a diagram showing an example general setup of a first embodiment of a transmitted sound control apparatus 10 of the present invention. The transmitted sound control apparatus 10 of FIG. 1 includes an opening portion 2 formed in a wall 1 that functions as a boundary surface partitioning between an outside and an inside of the room, and it is arranged to allow sound, propagated from the outside of the room into the room, to be heard by a human listener as sound having adjusted frequency characteristics.

As shown in FIG. 1, the transmitted sound control apparatus 10 also includes a film 3, a sound insulating plate 20, and an appropriate number of rod-shaped support members 30.

The film 3, which is a polyester film, is attached to or provided on the wall 1 in such a manner as to close or cover the opening portion 2. The sound insulating plate 20, which is disposed in the inside of the room, comprises a lamination of a resin-made sound reflecting plate 21 and a sound absorbing member 22. The sound reflecting plate 21 is made by forming a material (e.g., acryl resin), having a sound insulting performance or capability (or area density) equal to or less than that of the wall 1, into a plate shape. The sound absorbing member 22 is made of a porous material, such as glass wool.

As seen in FIG. 1, the support members 30 together constitute a support mechanism 30 that supports the sound insulating plate 20 in such a manner that a surface of the sound absorbing member 22 is opposed to the opening portion 2 with an interval d defined between the sound insulating plate 20 and the wall 1. In a case where the sound insulating plate 20 is of a rectangular shape, it may be fixed by respective one ends of four support members 30 being passed through portions of the sound insulating plate 20 near the four corners of the plate 20 and the respective other ends of the four support members 30 being passed through or embedded in the wall 1. In such a case, four bolts may be used as the four support members 30 each sandwiching the sound insulating plate 20 with two nuts threaded on the bolt. Such an arrangement allows the distance d between the sound insulating plate 20 and the wall 1 to be adjusted in response to manipulation of the nuts.

The forgoing have briefed the construction of the transmitted sound control apparatus 10. A sound produced outside the room propagates or transmits through the film 3, closing the opening portion 2, into the room. Then, the sound transmitted through the film 3 is reflected from the sound reflecting plate 21 of the sound insulating plate 20, and the thus-reflected sound is diffracted via side edge portions of the interval d, defined between the sound reflecting plate 21 and the wall 1, rearward to behind the reflecting plate 21 to propagate to or reach the human listener. In the instant embodiment, components of various frequency bands of the sound produced outside the room are changed when the sound transmits through the film 3, when it is reflected from the sound reflecting plate 21 and when it is diffracted to behind the reflecting plate 21, so that the sound can be made to be heard by a human listener as sound having desired frequency characteristics. In order to verify advantageous benefits of the instant embodiment, the inventor of the present invention conducted the following test.

First, the inventor set different Conditions 1-13 that differ in presence/absence (i.e., provided/not-provided) of the opening 2 in the wall 1, presence/absence of closure, by the film 3, of the opening portion 2, presence/absence (i.e., provided/not-provided) of the sound insulating plate 20, thickness of the film 3, distance between the opening portion 2 and the sound insulating plate 20 and size of the sound insulating plate 20, as shown in a table below. Then, the inventor caused a pink noise sound signal to be generated as sound outside the wall 1; picked up the sound via a microphone placed within the room at a distance of 50 cm from the wall 1; and determined a sound pressure level of every one-third octave of the sound picked up by the microphone under each of Conditions 1-13. In the test, the opening portion 2 formed in the wall 1 comprises three opening portions each having a diameter of 40 mm and disposed in a row at a 60-mm pitch. Further, the sound pressure levels of the individual frequency bands obtained under Condition 1 were set as reference sound pressure levels, and frequency characteristics of differences, from the reference sound pressure levels, of sound pressure levels of the individual frequency bands obtained under Conditions 2-13 (hereinafter referred to as "sound pressure level increase amounts" (dB)) are plotted in FIGS. 2, 3 and 4.

TABLE 1

| Condition | Opening Portion | Film | Sound Insulating Plate | Film Thickness (μm) | Size (mm) | Distance (mm) | Curve In Graphs of FIGS. 2-4 | Line Type |
|---|---|---|---|---|---|---|---|---|
| 1 | Not-Provided | Not-Provided | Not-Provided | — | — | — | — | |
| 2 | Provided | Not-Provided | Not-Provided | — | — | — | a0(b0) | ▬▬▬ |
| 3 | Provided | Provided | Not-Provided | 38 | — | — | a1 | ─ ─ ─ |
| 4 | Provided | Provided | Not-Provided | 50 | — | — | a2 | ─·─· |
| 5 | Provided | Provided | Not-Provided | 75 | — | — | a3 | ─··─ |
| 6 | Provided | Provided | Not-Provided | 100 | — | — | a4 | ─ ─· |
| 7 | Provided | Provided | Not-Provided | 125 | — | — | a5 | ········ |
| 8 | Provided | Provided | Not-Provided | 188 | — | — | a6 | ─·─·─ |
| 9 | Provided | Provided | Provided | 50 | 260 × 180 | 15 | b1 | ─···─ |
| 10 | Provided | Provided | Provided | 50 | 180 × 60 | 15 | b2(c2) | ─ ─ ─ |
| 11 | Provided | Provided | Provided | 50 | 180 × 60 | 0 | c1 | ─·─· |
| 12 | Provided | Provided | Provided | 50 | 180 × 60 | 30 | c3 | ─ ─ ─ |
| 13 | Provided | Not-Provided | Provided | 50 | 180 × 60 | 45 | c4 | ············ |

According to the graphs, the following relationships exist between the film 3 closing the opening portion 2 of the wall 1, the size of the sound insulating plate 20 and the distance between the opening portion 2 and the sound insulating plate 20 and the sound pressure level increase amounts of the individual frequency bands.

(1) In FIG. 2, a graph curve a0 indicates a sound pressure level increase amount vs. frequency characteristic in the case where the opening portion 2 in the wall 1 is not closed with the film 3. The graph curves a1, a2, a3, a4, a5 and a6 indicate sound pressure level increase amount vs. frequency characteristics in the case where the opening portion 2 in the wall 1 is closed with films 3 of different thicknesses. From the graph curves a0, a1, a2, a3, a4, a5 and a6, it can been seen that sound pressure level attenuation amounts in frequency bands higher than about 315 Hz in the case where the opening portion 2 is closed with the film 3 are greater than those in the case where the opening portion 2 is not closed with the film 3. Further, in the case where the opening portion 2 is closed with the film 3, sound pressure level increase amounts in the frequency bands higher than about 315 Hz decrease as the thickness of the film 3 increases; namely, the sound pressure level attenuation amounts in frequency bands higher than about 315 Hz increase as the thickness of the film 3 increases. Thus, by changing the thickness of the film 3 closing the opening portion 2, it is possible to control the sound pressure level increase amounts in predetermined frequency bands higher than a predetermined frequency (in the instant embodiment, 315 Hz).

(2) In FIG. 3, a graph curve b0 indicates a sound pressure level increase amount vs. frequency characteristic in the case where the opening portion 2 in the wall 1 is not closed with the film 3. Further, graph curves b1 and b2 indicate sound pressure level increase amount vs. frequency characteristics in the case where the size of the sound insulating plate 20 opposed to the opening portion 2 was differentiated with the thickness of the film 3 closing the opening portion 2 in the wall 1 kept the same. In FIG. 3, sound pressure level increase amounts in frequency bands higher than 1,000 Hz of a graph curve b1 are much lower than those in frequency bands higher than 1,000 Hz of the graph curve b0. Further, sound pressure level increase amounts in frequency bands higher than 1,600 Hz of a graph curve b2 are much lower than those in frequency bands higher than 1,600 Hz of the graph curve b0. From these graph curves b1 and b2 of FIG. 3, it can be seen that the frequency band where the sound pressure level increase amounts start greatly lowering shifts to a higher frequency side (or lower frequency side) as the size of the sound insulting plate 20 is reduced (or increased). Thus, the frequency band where the sound pressure level increase amounts start greatly lowering can be controlled by changing the size of the sound insulting plate 20.

(3) Graph curves c1, c2, c3 and c4 of FIG. 4 indicate sound pressure level increase amount vs. frequency characteristics in the case where the distance between the wall 1 and the sound insulating plate 20 was changed in steps of 15 mm from 0 mm to 45 with the thickness of the film 3, closing the opening portion 2 in the wall 1, kept the same. Focusing on frequency bands higher than 250 Hz but lower than 1,000 Hz in FIG. 4, there is little difference in sound pressure level increase amount among the graph curves c2, c3 and c4 (with the distance between the wall 1 and the sound insulating plate 20 set in the range of 15 mm-45 mm), but sound pressure level increase amounts of the graph curve c1 (with the distance between the wall 1 and the sound insulating plate 20 set at 0 mm) are markedly lower than those of the graph curves c2, c3 and c4. Thus, the sound pressure level increase amounts in the predetermined frequency bands higher than 250 Hz but lower than 1,000 Hz can be decreased by decreasing the distance d between the wall 1 and the sound insulating plate 20 to 0 mm from a predetermined value greater than 0 mm (value in the range of 15 mm-45 mm in the instant embodiment). Further, the sound pressure level increase amounts in the predetermined frequency bands higher than 250 Hz but lower than 1,000 Hz can be increased by increasing the distance d between the wall 1 and the sound insulating plate 20 from 0 mm to a desired value (15 mm in the instant embodiment).

On the basis of the aforementioned test results, the inventor has invented a transmitted sound control apparatus 10A, as a specific applied example of the transmitted sound control apparatus 10 of FIG. 1, which includes a support mechanism for supporting the sound insulating plate 20 in such a manner as to permit a change in a positional relationship of the sound insulating plate 20 relative to the opening portion 2.

Figure 6:
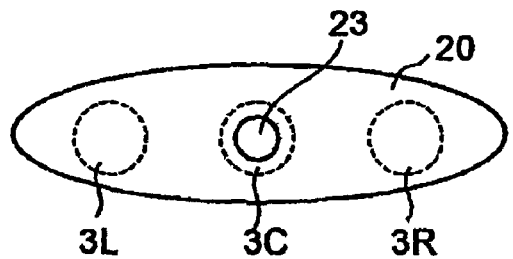
FIG. 6 is a sectional view of the transmitted sound control apparatus of FIG. 5 taken along the A-A' line of FIG. 5.

FIG. 5 is a block diagram showing a general setup of the transmitted sound control apparatus 10A constructed as a specific applied example of the apparatus 10 of FIG. 1, and FIG. 6 is a sectional view of the transmitted sound control apparatus 10A taken along the A-A' line of FIG. 5, i.e. as viewed in a direction from the interior of the room toward the wall 1. In the transmitted sound control apparatus 10A, as shown in FIG. 6, the wall 1 has three opening portions 2L, 2C and 2R formed therein in a horizontal (i.e., left-right) row, and it also has three films 3L, 3C and 3R attached to or provided on the wall 1 in such a manner as to close or cover respective ones of the three opening portions 2L, 2C and 2R.

The transmitted sound control apparatus 10A also includes the support mechanism 35 having an actuator 41 that translates a box-shaped casing member 31 along a translation shaft extending normally to the surface of the wall 1. Another actuator 40 is fixed within the casing member 31. This actuator 40 has a rotation shaft 23 projecting from the casing member 31 toward the wall 1 at right angles thereto, and this rotation shaft 23 is rotatable by the actuator 40. The sound insulating plate 20 is fixed to the distal end of the rotation shaft 23 of the actuator 40 to lie parallel to the surface of the wall 1. The rotation shaft 23 extends normally to the surface of the sound insulating plate 20. As shown in FIG. 6, the sound insulating plate 20 has an elliptical shape, which therefore has uneven dimensions from the rotation center of the rotation shaft 23 to the outer peripheral edge thereof. Note that the sound insulating plate 20 may be of any other shape than an elliptical shape as long as it has uneven dimensions from the rotation center of the rotation shaft 23 to the outer peripheral edge thereof. For example, the rotation shaft 23 may be fixed at its distal end to a position of the sound insulating plate 20, having a circular shape, which is displaced from the center of the plate 20.

Figure 7:
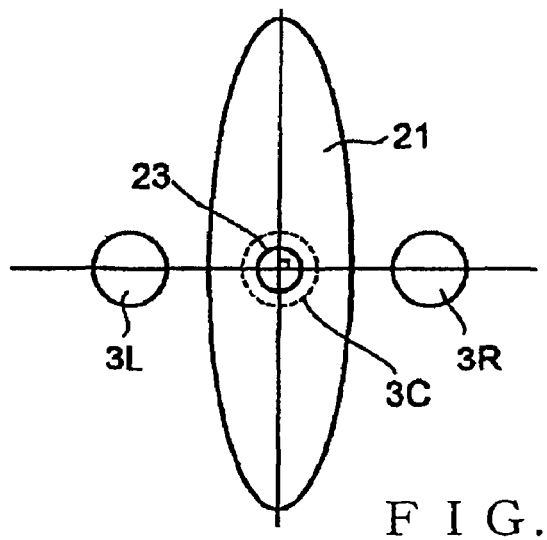
FIG. 7 is a sectional view of the transmitted sound control apparatus of FIG. 5 taken along the A-A' line of FIG. 5.

As also seen in FIG. 6, the middle opening portion 2C of the three opening portions 2L, 2C and 2R formed in the wall 1 overlaps the rotation shaft 23 when viewed in the direction from the interior of the room toward the wall 1. If an angle θ ($0 \leq \theta \leq 90$) defined by the long (or main) axis of the sound insulating plate 20 and a line interconnecting the respective centers of the films 3L, 3C and 3R is zero degree as shown in FIG. 6, a surface of the sound insulating plate 20 opposed to the opening portions 2L, 2C and 2R has the greatest area. Further, if the angle θ defined by the long axis of the sound insulating plate 20 and the line interconnecting the respective centers of the films 3L, 3C and 3R is 90 degrees as shown in FIG. 7, the surface of the sound insulating plate 20 opposed to the opening portions 2L, 2C and 2R has the smallest area.

The actuator 41 moves or translates the sound insulating plate 20 toward or away from the wall 1 to thereby decrease or increase the distance d between the wall 1 and the sound insulating plate 20.

In the transmitted sound control apparatus 10A of FIG. 5, the actuators 40 and 41 control the area of the surface of the sound insulating plate 20 opposed to the opening portions 2L, 2C and 2R and the distance d between the wall 1 and the sound insulating plate 20. Thus, the transmitted sound control apparatus 10A can change a way of controlling frequency characteristics of sound, transmitted from outside the room into the room through the films 3L, 3C and 3R closing the opening portions 2L, 2C and 2R, in accordance with a desire or convenience of a human listener present in the room.

Second Embodiment

Figure 8:
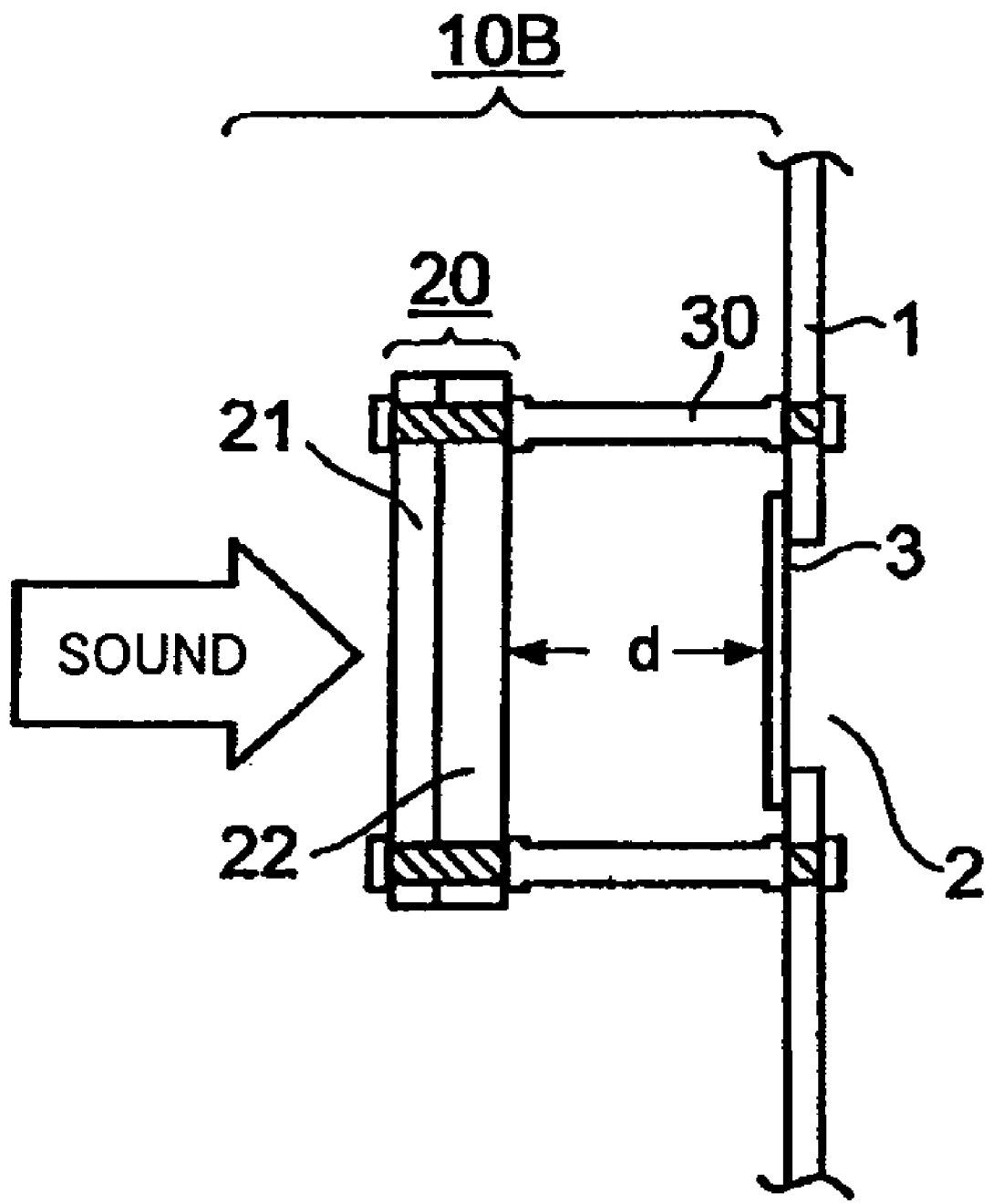
FIG. 8 is a view showing a construction of a second embodiment of the transmitted sound control apparatus of the present invention.

FIG. 8 is a view showing a construction of a second embodiment of the transmitted sound control apparatus 10B of the present invention, where similar elements to those in FIG. 1 are indicated by the same reference numerals as in FIG. 1. The second embodiment of the transmitted sound control apparatus 10B is provided outside the wall 1 partitioning between the outside and the inside of the room. Namely, whereas the transmitted sound control apparatus 10, 10A is located between the wall 1 and the human listener (sound receiving point) according to the first embodiment, the wall 1 is located between the transmitted sound control apparatus 10B and the human listener (sound receiving point). More specifically, in the transmitted sound control apparatus 10B, the film 3 is attached to or provided on a side of the opening portion 2 of the wall 1 facing outside of the room in such a manner as to close or cover the opening portion 2. The sound insulating plate 20 is supported by the support members 30 in such a manner that a surface of the sound absorbing member 22 of the sound absorbing member 22 is opposed to the opening portion 2 (facing toward the interior of the room) with an interval d defined between the sound insulating plate 20 and the wall 1.

Sound produced outside the room first arrives at the sound insulating plate 20, so that part of the sound is reflected from the sound reflecting plate 21 of the sound insulating plate 20. Then, the thus-reflected sound and another part of the sound, having propagated past sides of the sound reflecting plate 21, are diffracted rearward to behind the reflecting plate 21 (i.e., behind the sound absorbing member 22), propagate to the film 3 via spaces adjacent to the lateral sides of the interval d between the sound reflecting plate 21 and the wall 1, and then reach the human listener.

Whereas sound follows a propagation path of "sound source outside the room→film 3→sound reflecting plate 21→human listener in the room" (hereinafter referred to "propagation path PATH1") in the first embodiment, sound follows a propagation path of "sound source outside the room→sound reflecting plate 21→film 3→human listener in the room" (hereinafter referred to "propagation path PATH2") in the second embodiment. If the propagation path PATH1 is divided into three sections: a section between the sound source and the film 3; a section between the film 3 and the sound reflecting plate 21; and a section between the sound reflecting plate 21 and the human listener in the room, the propagation path PATH1 can be deemed to be a linear system because respective transfer functions in these three section are each linear. Thus, a transfer function of the propagation path PATH2, where the order of the film 3 and sound reflecting plate 21 is reversed from that in the propagation path PATH1, is the same as the transfer function of the propagation path PATH1. Therefore, with the second embodiment, sound produced outside the room can be made to be heard by the human listener as sound having the same transmission characteristics (same frequency characteristics) as with the first embodiment of the transmitted sound control apparatus 10.

Third Embodiment

Figure 9:
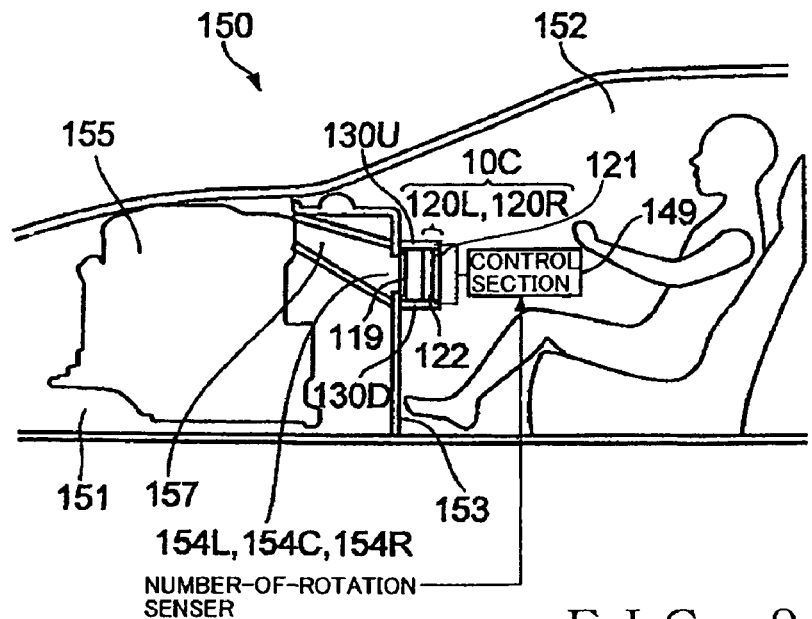
FIG. 9 is a view showing constructions of a third embodiment of the transmitted sound control apparatus of the present invention and an automotive vehicle provided with the third embodiment of the transmitted sound control apparatus.
Figures 10A, 10B:
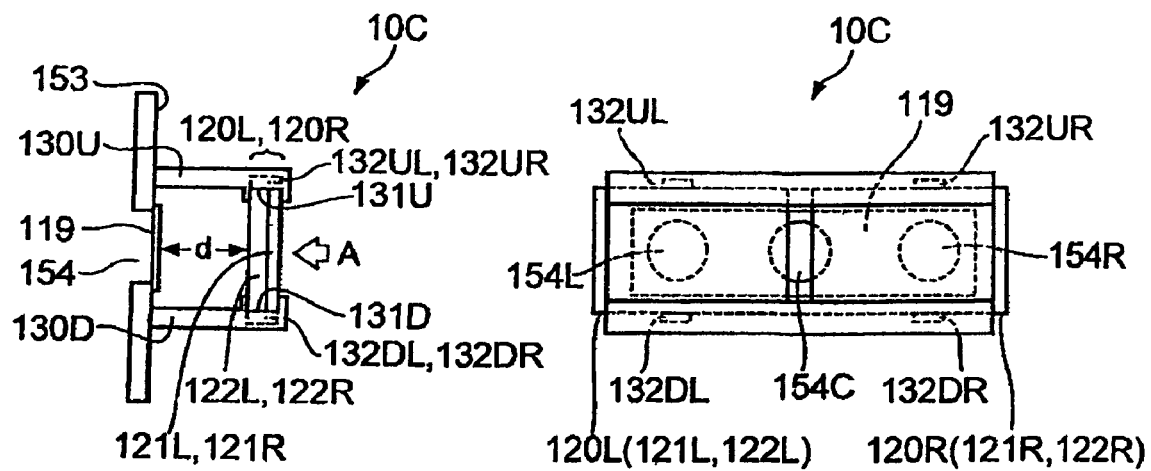
FIGS. 10A and 10B are enlarged views of the transmitted sound control apparatus shown in FIG. 9.

FIG. 9 is a view showing constructions of a third embodiment of the transmitted sound control apparatus 10C of the present invention and an automotive vehicle 150 provided with the third embodiment of the transmitted sound control apparatus 10C. FIG. 10A is an enlarged view of the transmitted sound control apparatus 10C shown in FIG. 9, and FIG. 10B is a view showing the transmitted sound control apparatus 10C as viewed in a direction of arrow A of FIG. 10A. In the third embodiment, three opening portions 154L, 154C and 154R are provided, in a horizontal row in a width direction of the vehicle 150, in a dashboard 153 that is a boundary surface partitioning between an engine room 151 and an interior space 152 of a passenger compartment. The opening portions 154L, 154C and 154R are each in the shape of a true circle of a same diameter. Between an engine 155 in the engine room 151 and the opening portions 154L, 154C and 154R is provided a duct 157 for directing air intake sound, emitted from the engine 155, to the opening portions 154L, 154C and 154R.

The transmitted sound control apparatus 10C is constructed to allow air intake sound, propagated from the engine 155 into the passenger compartment interior space 152 via the duct 157 and opening portions 154L, 154C and 154R, to be heard by the human listener as sound having adjusted frequency characteristics.

As shown in FIG. 9, the transmitted sound control apparatus 10C includes a film 119, a pair of left and right sound insulating plates 120L and 120R, a pair of upper and lower support members 130U and 130D, and a control section 149. The film 119 is a polyester film, and it is attached to the opening portions 154L, 154C and 154R of the dashboard 153 in such a manner as to close or cover the opening portions 154L, 154C and 154R and thereby close the passenger compartment interior space 152.

The sound insulating plate 120L comprises a lamination of a sound reflecting plate 121L and a sound absorbing member 122L, while the sound insulating plate 120R comprises a lamination of a sound reflecting plate 121R and a sound absorbing member 122R. The sound reflecting plate 121L is made by forming a material (e.g., acryl resin), having a sound insulting performance or capability (or area density) equal to or less than that of the dashboard 153, into a plate shape having a length and wide greater than the diameter of the opening portions 154L, 154C and 154R. The sound reflecting plate 121R is made by forming the same material as the sound reflecting plate 121L into a plate shape having the same size as the sound reflecting plate 121L. The sound absorbing members 122L and 122R are each made of a porous material, such as glass wool.

The upper and lower support members 130U and 130D perform a first function of supporting the sound insulating plates 120L and 120R in such a manner that respective one surfaces of the sound absorbing members 122L and 122R of the plates 120L and 120R are opposed to the opening portions 154L, 154C and 154R with an interval d defined between the sound insulating plates 120L and 120R and the dashboard 153, and a second function of moving the two sound insulating plates 120L and 120R toward or away from each other along a plane parallel to the row of the opening portions 154L, 154C and 154R.

More specifically, the support member 130U projects from a position of the dashboard 153, located slightly above the opening portions 154L, 154C and 154R, into the passenger compartment interior space 152. The lower support member 130D projects from a position of the dashboard 153, located slightly below the opening portions 154L, 154C and 154R, into the passenger compartment interior space 152. A rail 131U extending in the vehicle width direction (i.e., direction parallel to the horizontal row of the opening portions 154L, 154C and 154R) is provided on the lower surface of the upper support member 130U opposed to the lower support member 130D, while a rail 131D extending in the vehicle width direction is provided on the upper surface of the lower support member 130D opposed to the upper support member 130U.

Upper and lower end surfaces of the sound insulating plates 120L and 120R are fitted respectively in the rail 131U of the upper support member 130U and rail 131D of the lower support member 130D. Drive sections 132UL and 132UR are provided in longitudinally opposite end portions of the rail 131U of the upper support member 130U, while drive sections 132DL and 132DR are provided in longitudinally opposite end portions of the rail 131D of the lower support member 130D. Under control of the control section 149, the drive sections 132UL, 132UR, 132DL and 132DR move the sound insulating plates 120L and 120 along the rails 131U and 131D.

The control section 149 receives, from a number-of-rotation sensor (crank angle sensor) provided in the engine 155, a detection signal indicative of the number of rotations of the engine 155. Then, once the number of rotations of the engine 155 increases, the control section 149 supplies each of the above-mentioned drive sections 132UL, 132UR, 132DL and 132DR with a control signal for moving the sound insulating plates 120L and 120R outwardly (i.e., in a direction where the plates 120L and 120R get away from each other). Once the number of rotations of the engine 155 decreases, the control section 149 supplies each of the drive sections 132UL, 132UR, 132DL and 132DR with a control signal for moving the sound insulating plates 120L and 120R inwardly (i.e., in a direction where the plates 120L and 120R get closer to each other). Thus, in accordance with the control signal from the control section 149, the drive sections 132UL, 132UR, 132DL and 132DR move the sound insulating plates 120L and 120R outwardly (away from each other) or inwardly (toward each other).

As the control section 149 moves the sound insulating plates 120L and 120R outwardly away from each other from a position where the plates 120L and 120R contact each other, a rectangular gap is formed between the plates 120L and 120R, so that an area of the surfaces of the plates 120L and 120R opposed to the opening portions 154L, 154C and 154R decreases. Conversely, as the control section 149 moves the sound insulating plates 120L and 120R inwardly toward each other from a position where a gap is formed between the plates 120L and 120R, the area of the surfaces of the plates 120L and 120R opposed to the opening portions 154L, 154C and 154R increases.

The foregoing have described the construction of the third embodiment of the transmitted sound control apparatus 10C. In the transmitted sound control apparatus 10C, components of various frequency bands of air intake sound emitted from the engine 155 during travel of the automotive vehicle 150 are changed when the sound transmits through the film 119, when it is reflected from the sound reflecting plates 121L and 121R and when it is diffracted, via spaces adjacent to the lateral sides of the interval d between the reflecting plates 121L and 121R and the dashboard 153, to behind the reflecting plates 121L and 121R, so that the sound can be made to be heard by the human listener, present in the passenger compartment interior space 152, as sound having desired frequency characteristics.

When the number of rotations of the engine 155 has increased and frequencies of harmonics (i.e., frequencies of a fundamental and second-order harmonic, third-order harmonic, . . . ) included in air intake sound have increased, the transmitted sound control apparatus 10C operates to decrease the area of the surfaces of the plates 120L and 120R opposed to the opening portions 154L, 154C and 154R. Conversely, when the number of rotations of the engine 155 has decreased and frequencies of harmonics included in air intake sound have decreased, the transmitted sound control apparatus 10C operates to increase the area of the surfaces of the plates 120L and 120R opposed to the opening portions 154L, 154C and 154R.

As can be seen from the results shown in FIG. 3, the frequency band where the sound pressure level increase amounts start greatly lowering shifts to a higher frequency side as the area of the surfaces of the plates 120L and 120R opposed to the opening portions 154L, 154C and 154R decreases, but shifts to a lower frequency side as the area of the surfaces of the plates 120L and 120R opposed to the opening portions 154L, 154C and 154R increases. Thus, the transmitted sound control apparatus 10C behaves in such a manner that, when the number of rotations of the engine 155 has increased and frequencies of harmonics included in air intake sound have increased, frequency bands of sound transmitted through the apparatus 10C too shift to a higher frequency side in response to the change of the frequencies of the harmonics. As a result, the transmitted sound control apparatus 10C can cause the air intake sound to be heard by the human listener after positively selecting desired harmonics of the air intake sound changing in response to the number of rotations of the engine 155.

Fourth Embodiment

Figure 11:
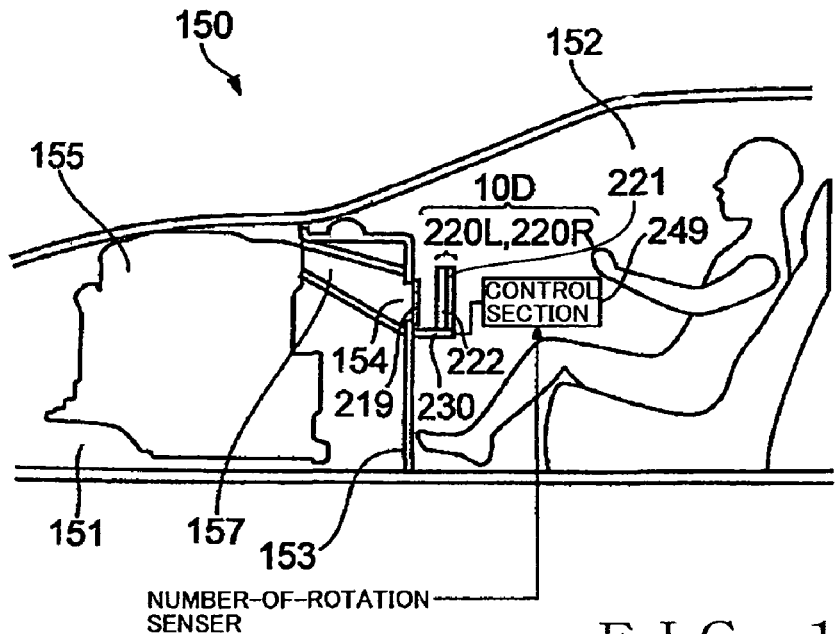
FIG. 11 is a view showing constructions of a fourth embodiment of the transmitted sound control apparatus of the present invention and an automotive vehicle provided with the fourth embodiment of the transmitted sound control apparatus.
Figures 12A, 12B:
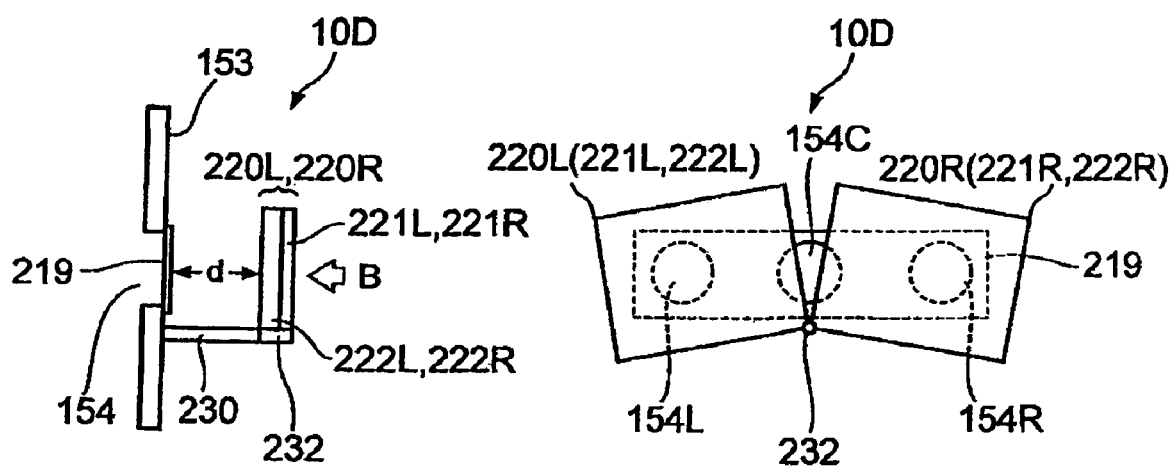
FIG. 12 is an enlarged view of the transmitted sound control apparatus shown in FIG. 11.

FIG. 11 is a view showing constructions of a fourth embodiment of the transmitted sound control apparatus 10D of the present invention and an automotive vehicle 150 provided with the fourth embodiment of the transmitted sound control apparatus 10D. FIG. 12A is an enlarged view of the transmitted sound control apparatus 10D shown in FIG. 11, and FIG. 12B is a view showing the transmitted sound control apparatus 10D as viewed in a direction of arrow B of FIG. 12A.

In the transmitted sound control apparatus 10D, as shown in FIG. 11, a film 219 is attached to the opening portions 154L, 154C and 154R of the dashboard 153. A support member 230 of a circular columnar shape projects from a position of the dashboard 153, located slightly below the opening portions 154L, 154C and 154R, into the passenger compartment interior space 152. The support member 230 performs a first function of supporting sound insulating plates 220L and 220R in such a manner that respective one surfaces of sound absorbing members 222L and 222R are opposed to the opening portions 154L, 154C and 154R with an interval d defined between the sound insulating plates 220L and 220R and the dashboard 153, and a second function of rotating the two plates 220L and 220R in opposite directions along a plane parallel to the opening portions 154L, 154C and 154R.

More specifically, a right lower corner portion of the sound insulating plate 220L and a left lower corner portion of the sound insulating plate 220R are connected to a distal end portion of the support member 230. A drive section 232 is provided in the distal end portion of the support member 230 to which are connected the sound insulating plates 220L and 220R. Under control of a control section 249, the drive section 232 rotates the sound insulating plates 220L and 220R with a connection portion between the sound insulating plates 220L and 220 and the drive section 232 functioning as a rotation axis.

Once the number of rotations of the engine 155 increases, the control section 249 supplies the drive section 232 with a control signal for rotating the sound insulating plate 220L in a counterclockwise direction and the sound insulating plate 220R in a clockwise direction. Conversely, once the number of rotations of the engine 155 decreases, the control section 249 supplies the drive section 232 with a control signal for rotating the sound insulating plate 220L in the clockwise direction and the sound insulating plate 220R in the counterclockwise direction. Thus, the drive section 232 rotates the sound insulating plates 220L and 220R in accordance with the control signal supplied from the control section 249. The transmitted sound control apparatus 10D behaves in such a manner that, when the number of rotations of the engine 155 has increased and frequencies of harmonics included in air intake sound have increased, frequency bands of sound transmitted through the apparatus 10D too shift to a higher frequency side in response to the change of the frequencies of the harmonics. As a result, the transmitted sound control apparatus 10D allows the air intake sound to be heard by the human listener after positively selecting desired harmonics of the air intake sound changing in response to the number of rotations of the engine 155.

Fifth Embodiment

Figure 13:
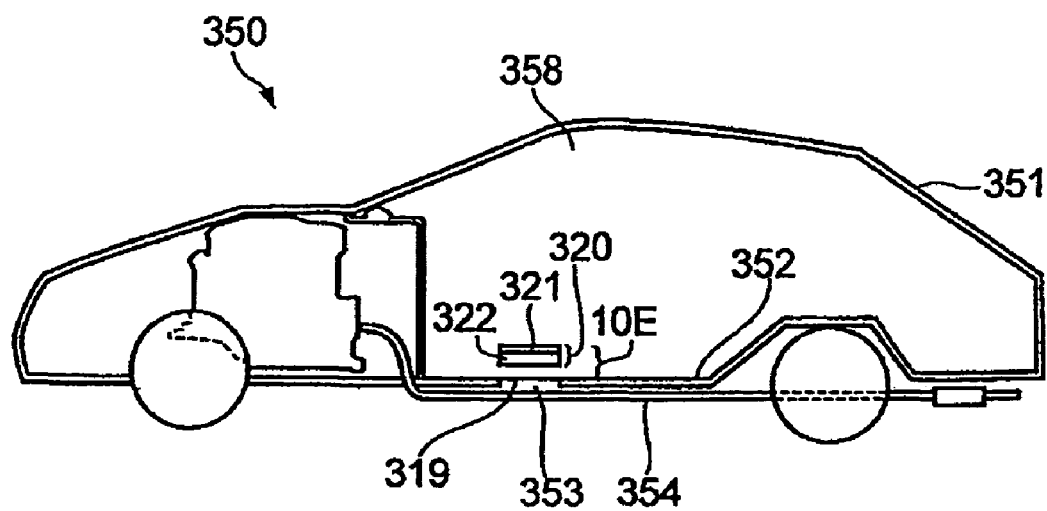
FIG. 13 is a view showing constructions of a fifth embodiment of the transmitted sound control apparatus of the present invention and an automotive vehicle provided with the fifth embodiment of the transmitted sound control apparatus.
Figure 14:
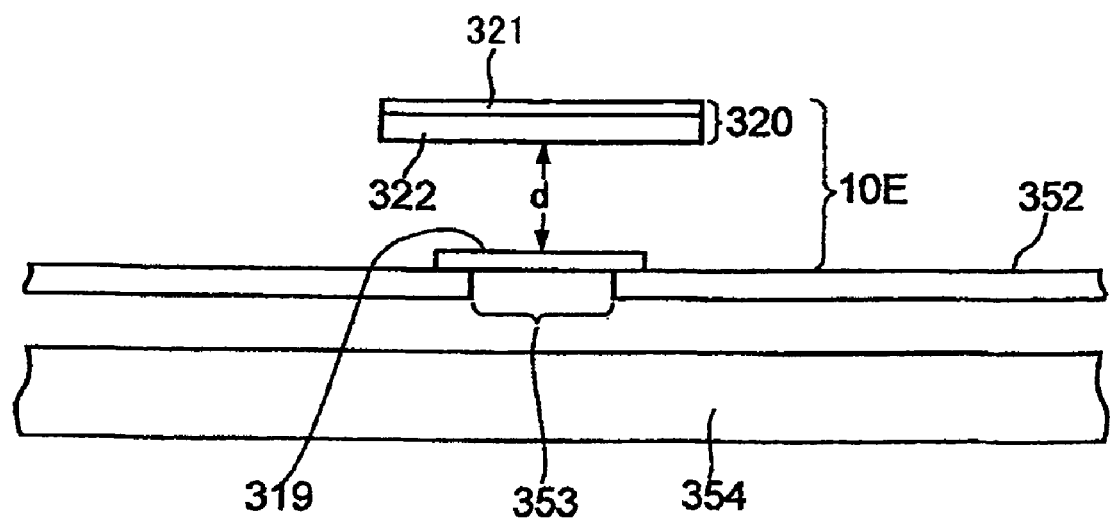
FIG. 14 is an enlarged view of the transmitted sound control apparatus shown in FIG. 13.

FIG. 13 is a view showing constructions of a fifth embodiment of the transmitted sound control apparatus 10E of the present invention and an automotive vehicle 350 provided with the fifth embodiment of the transmitted sound control apparatus 10E. FIG. 14 is an enlarged view of the transmitted sound control apparatus 10E shown in FIG. 13. In the fifth embodiment, an opening portion 353 is provided in a portion of a bottom plate 353 of a body 351 of the automotive vehicle 350 immediately above an exhaust pipe 354. The transmitted sound control apparatus 10E is constructed to allow exhaust sound, emitted from the exhaust pipe 354 during travel of the automotive vehicle 350, to be heard by a human listener, present in a passenger compartment inner space 358, as sound having adjusted frequency characteristics.

As shown in FIG. 13, the transmitted sound control apparatus 10E includes a film 319 and a sound insulating plate 320. The film 319 is a polyester film, and it is attached to the opening portion 353 in such a manner as to close or cover a side of the opening portion 353 facing toward the passenger compartment inner space 358 and thereby prevent foreign matters, such as water and sand, and air (hot and cold air) from entering from outside the passenger compartment into the passenger compartment. The sound insulating plate 320 comprises a lamination of a sound reflecting plate 321 and a sound absorbing member 322. The sound insulating plate 320 is supported in such a manner that one surface of the sound absorbing member 322 of the plate 320 is opposed to the opening portion 353 with an interval d defined between the sound insulating plate 320 and the bottom plate 352 of the body 351. The sound insulating plate 320 may be supported by any of various means. For example, the sound insulating plate 320 may be attached to a portion of a seat (not shown), fixed to the bottom plate 352, immediate above the opening portion 353.

The foregoing have described the construction of the fifth embodiment of the transmitted sound control apparatus 10E. In the transmitted sound control apparatus 10E, components of various frequency bands of exhaust sound emitted from the exhaust pipe 354 during travel of the automotive vehicle 350 are changed when the sound transmits through the film 319, when it is reflected from the sound reflecting plate 321 and when it is diffracted, via lateral sides of the interval d between the reflecting plate 321 and the film 319, to behind the reflecting plate 321. The transmitted sound control apparatus 10E behaves in such a manner that, when the number of rotations of the engine 155 has increased and frequencies of harmonics included in exhaust sound of the engine 155 have increased, frequency bands of sound transmitted through the apparatus 10E too shift to a higher frequency side in response to the change of the frequencies of the harmonics. As a result, the transmitted sound control apparatus 10E allow the exhaust sound to be heard by the human listener after positively selecting desired harmonics of the exhaust sound changing in response to the number of rotations of the engine 155.

Sixth Embodiment

FIG. 15 is a view showing constructions of a sixth embodiment of the transmitted sound control apparatus 10F of the present invention and an automotive vehicle 450 provided with the sixth embodiment of the transmitted sound control apparatus 10F. FIG. 16 is an enlarged view of the transmitted sound control apparatus 10F shown in FIG. 15. In the sixth embodiment, an opening portion 453 is provided in a portion of a body 451 of the automotive vehicle 450 immediately above a muffler 455.

The transmitted sound control apparatus 10F is constructed to allow muffled exhaust sound, emitted from the muffler 455 to propagate into a passenger compartment interior space 458 during travel of the automotive vehicle 450, to be heard by a human listener, present in a passenger compartment inner space 458, as sound having adjusted frequency characteristics. The film 419 is attached to the opening portion 453 in such a manner as to close or cover a side of the opening portion 453 facing toward the passenger compartment inner space 458. A sound insulating plate 420 is supported in such a manner that one surface of a sound absorbing member 422 of the plate 420 is opposed to the opening portion 453 with an interval d defined between the sound insulating plate 420 and the body 451. The sound insulating plate 420 may be supported by any of various means. For example, the sound insulating plate 420 may be supported by being fixed to the distal ends of a plurality of supporting struts projecting upwardly from a peripheral region of the opening portion 453 of the body 451.

The foregoing have described the construction of the sixth embodiment of the transmitted sound control apparatus 10F. In the transmitted sound control apparatus 10F, components of various frequency bands of muffled exhaust sound emitted from the muffler 455 during travel of the automotive vehicle 450 are changed when the sound transmits through the film 419, when it is reflected from a sound reflecting plate 421 of the sound insulating plate 420 and when it is diffracted, via lateral sides of the interval d between the reflecting plate 421 and the film 419, to behind the reflecting plate 421. The transmitted sound control apparatus 10F behaves in such a manner that, when the number of rotations of the engine 155 has increased and frequencies of harmonics included in exhaust sound of the engine 155 have increased, frequency bands of sound transmitted through the apparatus 10F too shift to a higher frequency side in response to the change of the frequencies of the harmonics. As a result, the transmitted sound control apparatus 10F allow the exhaust sound to be heard by the human listener after positively selecting desired harmonics of the exhaust sound changing in response to the number of rotations of the engine 155.

So far, the first to sixth embodiments of the present invention have been described; however, it should be appreciated that the present invention may be modified variously as exemplified hereinbelow.

Figure 17:
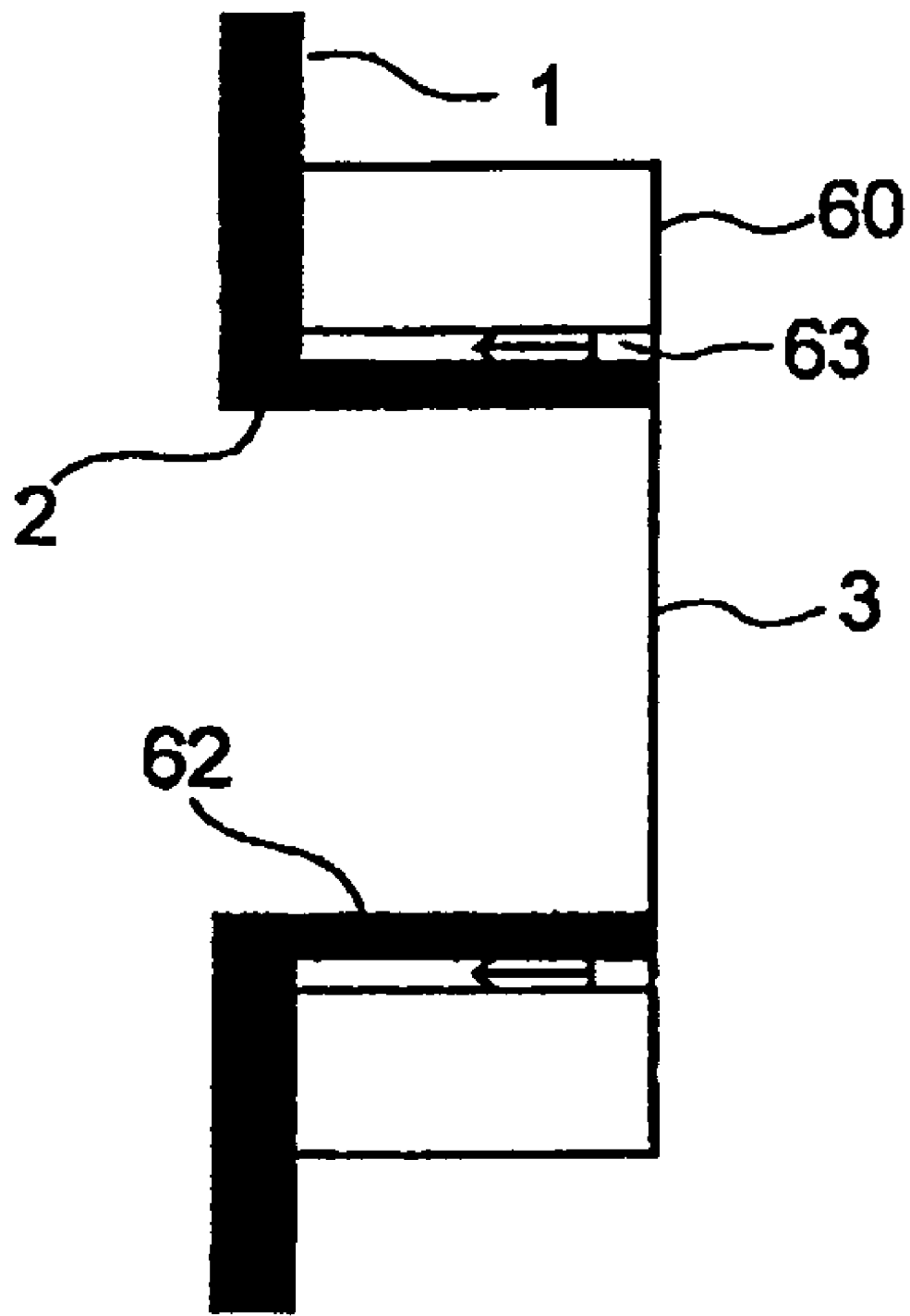
FIG. 17 is a view showing a construction of a tension impartment mechanism employed in another embodiment of the transmitted sound control apparatus of the present invention.

(1) As a modification of the above-described first embodiment of the transmitted sound control apparatus 10 and 10A, a tension impartment mechanism 60 may be provided for imparting tension to the film 3 closing the opening portion 2, as shown in FIG. 17. In such a modified transmitted sound control apparatus, the inner periphery of the opening portion 2 of the wall 1 projects inwardly of the room to define a hollow cylindrical section 62, and the hollow cylindrical section 62 is closed at its open end with the film 3. More specifically, the film 3 is attached at its outer peripheral portion to a ring-shaped frame 63, and this frame 63 is supported by the tension impartment mechanism 60 with the hollow cylindrical section 62 surrounded by the ring-shaped frame 63. The tension impartment mechanism 60 includes a mechanism for moving the ring-shaped frame 63 toward the outside of the room. As the tension impartment mechanism 60 moves the ring-shaped frame 63 toward the outside of the room, the frame 63 pulls the outer peripheral portion of the film 3 toward the outside of the room to thereby increase tension imparted to the film 3 that is supported at the open end of the hollow cylindrical section 62. In this transmitted sound control apparatus, low-frequency components of sound, propagated from outside the room into the room through the hollow cylindrical section 62, can be greatly attenuated by the tension impartment mechanism 60 imparting an increased tension to the film 3.

(2) As another modification of the above-described first to sixth embodiments of the transmitted sound control apparatus 10, 10A, 10B, 10C, 10D, 10E and 10F, a plurality of types of films 3 having different thicknesses may be prepared in advance so that any desired one of the plurality of types of films 3 can be selectively (i.e., replaceably) used to close the opening portion 2. Further, a plurality of types of sound insulating plates 20 having different characteristics may be prepared in advance so that any desired one of the plurality of types of sound insulating plates 20 can be selectively (i.e., replaceably) used and supported in opposed relation to the opening portion 2.

(3) In the above-described first to sixth embodiments of the transmitted sound control apparatus 10, 10A, 10B, 10C, 10D, 10E and 10F, the opening portion 2 need not necessarily be of a generally circular shape and may be of a rectangular or any other desired shape. Further, the number of the opening portion 2 may be two or four or more. In such a case, the opening portions may be differentiated from each other in shape and/or size. Further, the plurality of opening portions 2 may be disposed in any other desired arrangement or layout than in a left-right row as illustratively shown in FIG. 6. Alternatively, the plurality of opening portions 2 may be disposed in a layout such that a particular pattern is presented by these opening portions 2.

(4) In the above-described first embodiment of the transmitted sound control apparatus 10A, the support mechanism supporting the sound insulating plate 20 has the rotation shaft 23 projecting toward the wall 1 at right angles thereto, and a posture of the sound insulating plate 20 relative to the opening portions 2L, 2C and 2R of the wall 1 can be changed as need by being rotated about the rotation shaft 23. However, any other suitable means than the above-described may be employed for changing the posture of the sound insulating plate 20 relative to the opening portions 2L, 2C and 2R of the wall 1. For example, the support mechanism supporting the sound insulating plate 20 may have a rotation shaft extending in parallel to the wall 1 and stretchable and contractable in an up-down or left-right direction so that the posture of the sound insulating plate 20 relative to the opening portions 2L, 2C and 2R of the wall 1 can be changed as need by being rotated about the rotation shaft extending in parallel to the wall 1.

Figure 18:
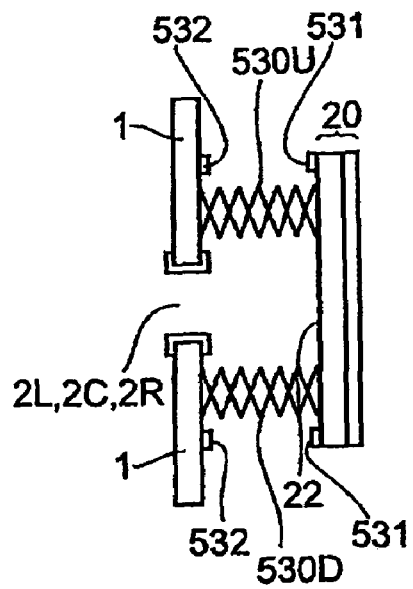
FIG. 18 is a view showing another embodiment of the transmitted sound control apparatus of the present invention.

(5) In the above-described first embodiment of the transmitted sound control apparatus 10A, the support mechanism supporting the sound insulating plate 20 has the translation shaft extending normally to the surface of the wall 1, and the sound insulating plate 20 is moved along the translation shaft toward or away from the wall 1 to thereby change (decrease or increase) the distance d between the openings 2L, 2C and 2R of the wall 1 and the sound insulating plate 20. Alternatively, the support mechanism for supporting the sound insulating plate 20 may have a translation shaft extending in the up-down or left-right direction in parallel relation to the surface of the wall 1 so that the area of the surface of the sound insulating plate 20 opposed to the openings 2L, 2C and 2R can be changed by the sound insulating plate 20 being translated along the translation shaft extending in the up-down or left-right direction. In short, it is only necessary that the sound insulating plate 20 be supported by a means or mechanism for translating the plate 20. Further, as shown in FIG. 18, link members 530U and 530D, each stretchable and contractable via a pantagraph mechanism, may be provided between positions of the wall 1 located slightly above and below the row of the opening portions 2L, 2C and 2R and one surface of the sound absorbing member 22 of the sound insulating plate 20 opposed to the wall 1, so as to change the distance between the sound insulating plate 20 and the opening portions 2L, 2C and 2R through stretch or contraction of the link members 530U and 530D. In this case, a packing member 531 may be provided on and along a peripheral region of the one surface of the sound absorbing member 22 of the sound insulating plate 20, and another packing member 532 may be provided on the wall 1 in opposed relation to the packing member 531. In this modified embodiment, a slight gap defined between the sound insulating plate 20 and the wall 1 when the link members 530U and 530D are in a completely contracted or collapsed position can be closed with the packing members 531 and 532, so that sound propagation from outside the room into the room can be completed blocked.

(6) In the above-described first embodiment of the transmitted sound control apparatus 10, the sound insulating plate 20 may be supported by a support member(s) made of a shape-memory alloy or the like so that the position and posture of the sound insulating plate 20 relative to the opening portion 2 can be changed with a finger(s) of the human listener.

(7) In the above-described first to sixth embodiments of the transmitted sound control apparatus 10, 10A, 10B, 10C, 10D, 10E and 10F, the sound insulating plate may be constructed of only the reflecting plate, and the sound absorbing member may be attached to or provided on the film. In short, it is only necessary that the sound absorbing member be provided between the opening portion and the reflecting plate.

(8) In the above-described first to sixth embodiments of the transmitted sound control apparatus 10, 10A, 10B, 10C, 10D, 10E and 10F, the opening portion may have no film attached thereto so that an outdoor sound having been transmitted through the opening portion(s) is propagated directly to the sound insulating plate.

(9) In the above-described third and fourth embodiments of the transmitted sound control apparatus 10C and 10D, the area of the surface of the sound insulating plate 20 opposed to the openings 2L, 2C and 2R is controlled in accordance with the number of rotations of the engine 155. Alternatively, the area of the surface of the sound insulating plate 20 opposed to the openings 2L, 2C and 2R may be controlled in accordance with detection information indicative of a traveling state, such as a traveling velocity, accelerator depression amount, number of passengers on a front passenger's seat and rear seat, fuel consumption amount per time, exhaust gas discharge amount per time or carbon dioxide discharge amount per time, of the automotive vehicle 150.

(10) In the above-described third to sixth embodiments of the transmitted sound control apparatus 10C, 10D, 10E and 10F, sound produced from a source other than the engine, exhaust gas pipe and muffler may be taken into the passenger compartment so as to be heard by the human listener as sound having adjusted frequency components. For example, an opening portion may be provided in a portion of the automotive vehicle body immediately above a rear road wheel and a film may be attached to the opening portion to close or cover the opening portion, so that sound of a tire transmitted through the film into the passenger compartment can be made to be heard by the human listener as sound having adjusted frequency components. Alternatively, an opening portion may be provided in a portion of a ceiling of the automotive vehicle body and a film may be attached to the opening portion to close or cover the opening portion, so that wind roar transmitted through the film into the passenger compartment can be made to be heard by the human listener as sound having adjusted frequency components. Namely, the sound to be subjected to frequency component adjustment by the transmitted sound control apparatus may be any sound as long as the sound is produced outside the room or passenger compartment of the automotive vehicle which the human listener is in, rather than being limited to the sound described above in relation to the first to sixth embodiments.

(11) In the above-described third and fourth embodiments of the transmitted sound control apparatus, the area of the surface of the sound insulating plate opposed to the opening portion is changed by the control section 149 or 249 moving or rotating the sound insulating plate. Alternatively, the area of the surface of the sound insulating plate opposed to the opening portion may be changed by changing the shape of the opening portion itself.

Figure 19A:
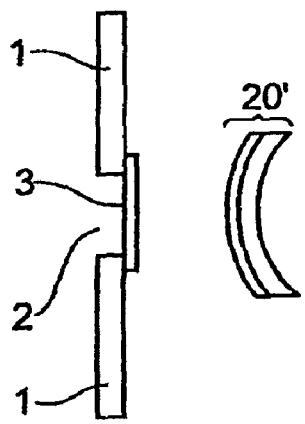
FIGS. 19A and 19B view showing other embodiments of the transmitted sound control apparatus of the present invention.
Figure 19B:
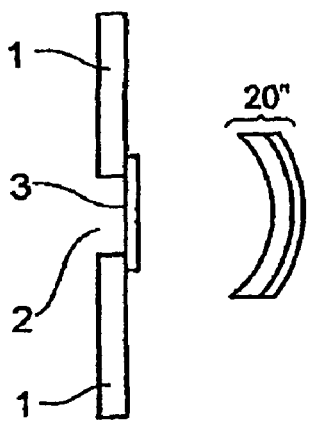

(12) In the above-described first to sixth embodiments of the transmitted sound control apparatus, the sound insulating plate 20 comprises a lamination of the flat sound reflecting plate and sound absorbing material. The sound insulating plate 20 may be replaced with a sound insulating plate 20' having a shape convexly curved toward the opening portion 2, as illustratively shown in FIG. 19A. Alternatively, the sound insulating plate 20 may be replaced with a sound insulating plate 20" having a shape convexly curved away from the opening portion 2, as illustratively shown in FIG. 19B.

(13) The first to sixth embodiments of the transmitted sound control apparatus have been described above as used to change frequency components of sound propagated from outside the room into the room or from outside the passenger compartment into the passenger compartment. However, the present invention may be applied to other purposes than the aforementioned. For example, an opening portion may be provided in a sound insulating wall in a musical instrument practicing room, which is sound insulated from the outside by the sound insulating wall, with a film attached to or provided on the opening portion to close or cover the opening portion, and a sound insulating plate may be provided inside the opening (i.e., in the interior of the practicing room). With this modified embodiment, frequency components of noise (sound) produced outside the practicing room is adjusted by the film and sound insulating plate so that the noise can be made to be heard by a human listener (human player) in the room as sound of acoustic quality that would not disturb the musical instrument practice. Alternatively, an opening portion may be provided in a wall of a housing having a noise source, such as a boiler, accommodated therein and sound-insulated from the outside by the wall, with a film attached to the opening portion to close or cover the opening portion and with a sound insulating plate provided outside the opening portion. Such a modified embodiment can adjust frequency components of noise by means of the film and sound insulating plate and make the noise to be heard by a person present outside the housing (e.g., pedestrian) as sound with an alleviated offensive or uncomfortable feeling.

(14) As a modification of the above-described third and fourth embodiments of the transmitted sound control apparatus, the sound insulating plate may be replaced with a structure already provided inside the dashboard 153 of the automotive vehicle 150 (i.e., in the passenger compartment interior space 152) or outside the dashboard 153 (i.e., in the engine room 151). For example, an interval d may be secured between a surface, opposite from an air outlet, of an airconditioner unit fixed substantially centrally on the dashboard 153 and the dashboard 153, and an opening portion 154' communicating with the engine room 151 may be provided in a position of the dashboard 153 facing the airconditioner unit with a film 119' attached to the opening portion 154'. In this modified embodiment, components of various frequency bands of air intake sound emitted from the engine 155 during travel of the automotive vehicle 150 are changed when the sound transmits through the film 119, when it is reflected from the surface, opposite from the air outlet, of the air conditioner unit and when it is diffracted, via spaces adjacent to lateral sides of the interval d defined between the surface opposite from the air outlet and the dashboard 153, into the passenger compartment interior space 152. Thus, the modified embodiment can achieve the same advantageous benefits as the third and fourth embodiments without using any sound insulating plate.

(16) In the above-described second embodiment of the transmitted sound control apparatus, the upper and lower support members 130U and 130D and the rails 131U and 131D extend in the vehicle width direction (i.e., direction parallel to the row of the opening portions 154L, 154C and 154R), and the sound insulating plates 120L and 120R are moved along the rails 131U and 131D. As a modification of the second embodiment, the sound insulating plates 120L and 120R may be moved in a direction slightly inclined relative to the direction parallel to the row of the opening portions 154L, 154C and 154R. In this modified embodiment, both the area of the surfaces of the sound insulating plates 120L and 120R opposed to the opening portion and the interval d between the sound insulating plates 120L and 120R and the opening portions 154L, 154C and 154R can be changed by moving the sound insulating plates 120L and 120R.

(17) In the above-described third embodiment of the transmitted sound control apparatus, the two sound insulating plates 220L and 220R are supported by one support member 230. Alternatively, the two sound insulating plates 220L and 220R may be supported by separate support members.

(18) In the above-described second embodiment of the transmitted sound control apparatus, three or more sound insulating plates 120 may be provided. Similarly, in the above-described third embodiment of the transmitted sound control apparatus, three or more sound insulating plates 220 may be provided.

Whereas the transmitted sound control apparatus of the present invention has been described above as applied to control sound transmitted from outside of a room into the room, it may be applied to control sound transmitted from outside of a vehicle into the vehicle.

This application is based on, and claims priorities to, JP PA 2009-102522 filed on 21 Apr. 2009 and JP PA 2010-080917 filed on 31 Mar. 2010. The disclosure of the priority applications, in its entirety, including the drawings, claims, and the specification thereof, is incorporated herein by reference.

What is claimed is:

1. A transmitted sound control apparatus for use with a boundary surface partitioning a space and having an opening portion, wherein the boundary surface is one of a plurality of walls forming an enclosed space and a sound is transmitted into the enclosed space through the opening portion, the transmitted sound control apparatus comprising:
   a sound insulating plate provided in the enclosed space and supported at a distance from the boundary surface and in an opposed relation to the opening portion;
   a support mechanism that supports the sound insulating plate in such a manner as to permit a change in a relative positional relationship of the sound insulating plate to the opening portion, the support mechanism having a rotation shaft for rotating thereabout the sound insulating plate, the rotation shaft extending normally to the sound insulating plate and the boundary surface.

2. The transmitted sound control apparatus of claim 1, wherein the sound insulating plate has a shape and is disposed on the rotation shaft such that dimensions from the rotational center of the rotation shaft to points on the perimeter of the insulating plate vary so that a surface area of the sound insulating plate opposing the opening portion is changeable by rotating the sound insulating plate.

3. The transmitted sound control apparatus of claim 1 further including a film disposed over the opening portion.

4. The transmitted sound control apparatus of claim 3 further including a tension imparting mechanism coupled to the film for controlling an amount of tension imparted to the film to vary frequency components of sound propagated through the opening portion, the tension imparting mechanism controllably pulling an outer peripheral portion of the film so as to controllably impart tension to the film.

5. The transmitted sound control apparatus of claim 1, wherein the support mechanism has a translation shaft for changing the distance between the sound insulating plate and the opening portion.

6. The transmitted sound control apparatus of claim 1, wherein a sound absorbing member is provided on a surface of the sound insulating plate opposed to the opening portion.

7. The transmitted sound control apparatus of claim 1, wherein the sound insulating plate includes a sound reflecting plate.

8. The transmitted sound control apparatus of claim 1 including a plurality of sound insulating plates which rotate in opposite directions about a rotation axis.

9. A vehicle comprising:
   a passenger compartment;
   a boundary surface partitioning the passenger compartment from a space external to the passenger compartment, the boundary surface having an opening portion; and
   a transmittal sound control apparatus including:
      a sound insulating plate supported at a distance from the boundary surface and in an opposed relation to the opening portion;
      a support mechanism that supports the sound insulating plate in such a manner as to permit a change in a relative positional relationship of the sound insulating plate to the opening portion, the support mechanism having a rotation shaft for rotating thereabout the sound insulating plate, the rotation shaft extending normally to the sound insulating plate and the boundary surface,
   wherein a sound source of the vehicle, the boundary surface and the sound insulating plate are sequentially arranged in the stated order.

10. A transmitted sound control apparatus for a vehicle, the vehicle including a wall having an opening portion, the transmitted sound control apparatus comprising;
   a sound insulating plate supported at a distance from the opening portion;
   a drive section coupled to the sound insulating plate for moving the sound insulating plate so that a surface area of the sound insulating plate opposing the opening portion is changeable;
   a sensor for receiving information indicative of an operating parameter of the vehicle; and
   a control section, responsive to the sensor and coupled to the drive section, for controlling the surface area of the sound insulating plate opposing the opening portion based on the operating parameter,
   wherein a sound source of the vehicle, the wall and the sound insulating plate are sequentially arranged in the stated order.

11. The sound control apparatus as claimed in claim 10, wherein the sound insulating plate is supported by a plurality of rails and the drive section moves the sound insulating plate along the plurality of rails.

12. The sound control apparatus as claimed in claim 10, wherein the sound insulating plate is supported by a support member which rotates the sound insulating plate along a plane parallel to opening portion.

13. The sound control apparatus as claimed in claim 10, wherein the operating parameter is a rotational speed of an engine of the vehicle.

14. The sound control apparatus as claimed in claim 10, wherein the operating parameter is a velocity of the vehicle.

15. The sound control apparatus as claimed in claim 10, wherein the operating parameter is an accelerator depression amount of the vehicle.

16. A transmitted sound control apparatus for use with a boundary surface partitioning a space and having an opening portion, wherein the boundary surface is one of a plurality of walls forming an enclosed space and a sound is transmitted into the enclosed space through the opening portion, the transmitted sound control apparatus comprising:
   a sound insulating plate provided in the enclosed space and supported at a distance from the boundary surface and in an opposed relation to the opening portion; and
   a support mechanism that supports said sound insulating plate in such a manner as to permit a change in a relative positional relationship of said sound insulating plate to the opening portion, the support mechanism having a rod fixed on the wall of the boundary surface and extending normally from the boundary surface to the sound insulating plate.

* * * * *